Patented Oct. 23, 1923.

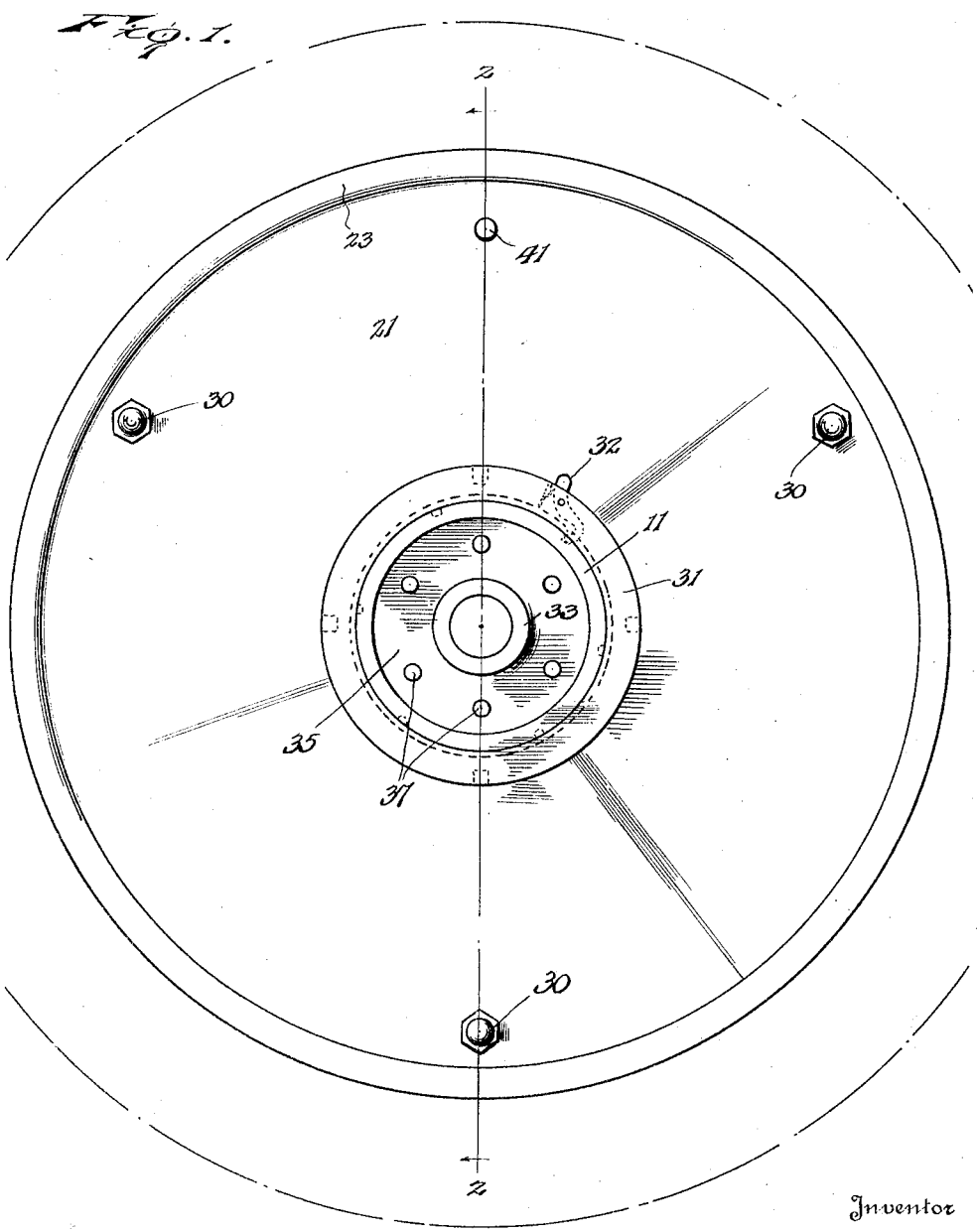

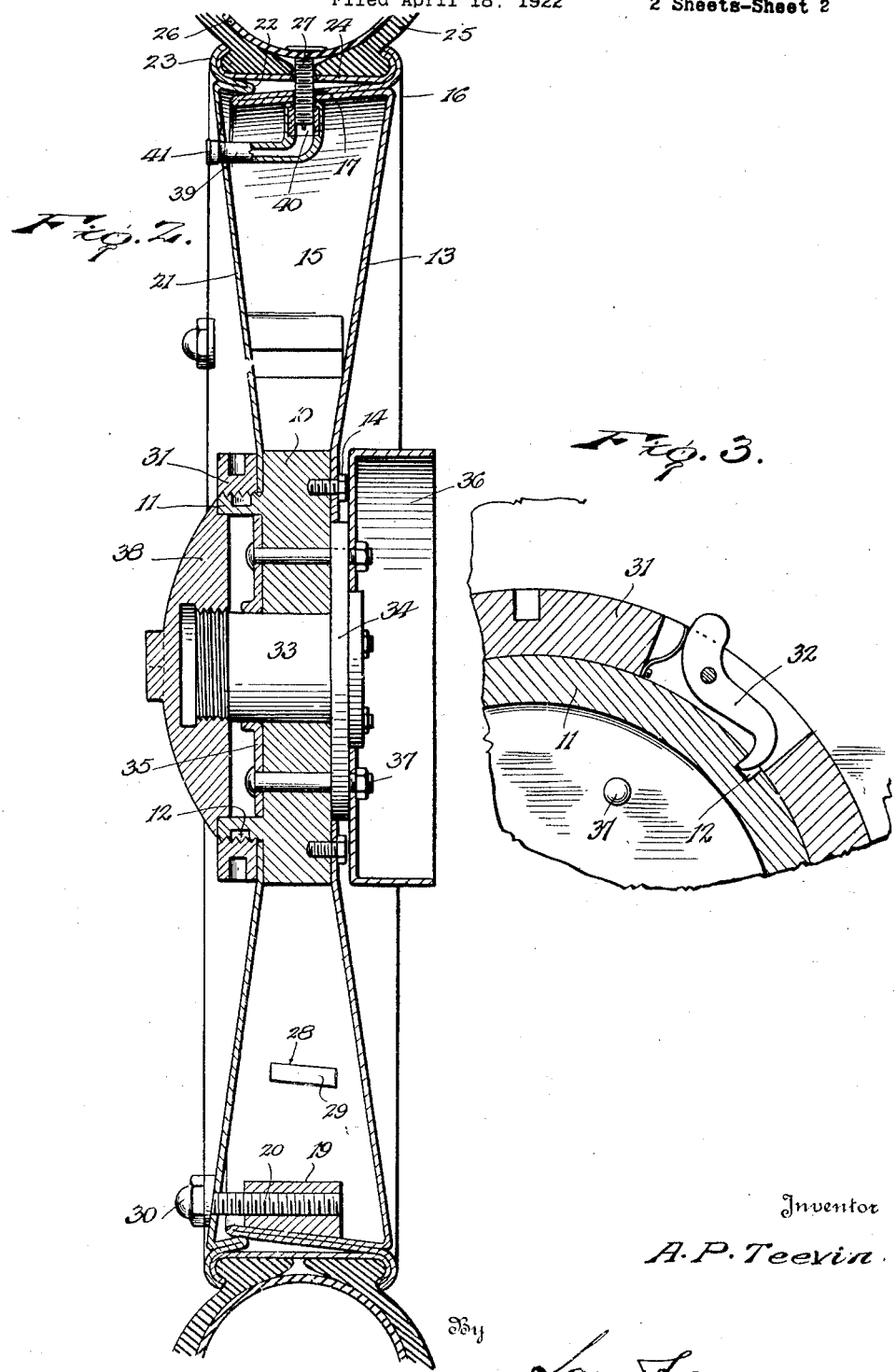

1,471,812

UNITED STATES PATENT OFFICE.

ANDREW PATRICK TEEVIN, OF DETROIT, MICHIGAN.

DISK WHEEL.

Application filed April 18, 1922. Serial No. 554,894.

*To all whom it may concern:*

Be it known that I, ANDREW P. TEEVIN, citizen of the United States, residing at Detroit, in the county of Wayne and State of Michigan, have invented certain new and useful Improvements in Disk Wheels, of which the following is a specification.

This invention relates to an improved disk wheel for motor vehicles and seeks, as one of its principal objects, to provide a wheel which may be employed in conjunction with conventional wheel hubs.

A further object of the invention is to provide a wheel which may be readily attached and which, in practical use, will function with entire efficiency.

And the invention has as a still further object to provide a wheel wherein one of the disks may be removed to permit easy and quick removal or replacement of a tire carried by the wheel.

Other and incidental objects will appear hereinafter.

In the drawings:

Figure 1 is an elevation of my improved wheel, the hub cap employed being removed and the wheel being shown in connection with a conventional wheel hub, Figure 2 is a sectional view on the line 2—2 of Figure 1, looking in the direction of the arrows, and Figure 3 is an enlarged detail sectional view showing the latch for the clamping ring of the wheel.

Referring now more particularly to the drawings, I employ a hub ring 10 provided at its outer side with an annular flange 11 in the outer periphery of which is formed a plurality of circumferentially spaced notches or sockets 12. Mounted upon the ring at its inner side is a dished inner disk 13 provided centrally with an opening somewhat larger than the opening through the ring 10 and extending through the inner margin of the disk is a plurality of cap bolts 14 securing the disk upon the ring. The disk is preferably formed of suitable resilient sheet metal bent into overlapping relation to provide an annular rim section 15, the outer thickness of which is continued to form an annular side flange 16 at the periphery of the disk. As shown in Figure 2, the rim section 15 is formed with an opening 17 to accommodate the valve of a tire. Mounted upon the rim section 15 at its inner side is a plurality of circumferentially spaced blocks 19. These blocks are preferably three in number and threaded into said blocks are stud bolts 20 projecting laterally at the free side edge of the rim section.

Detachably connected to the hub ring 10 at its outer side is a dished outer disk 21 formed centrally with an opening to freely accommodate the flange 11 of said ring so that the disk may be readily fitted thereover to seat flat against the ring, the disks 13 and 21 being dished inwardly toward each other. The disk 21, like the disk 13, is preferably formed from suitable resilient sheet metal bent into overlapping relation to provide a relatively narrow rim section 22 snugly surrounding the free margin of the rim section 15 mating therewith while the outer thickness of the rim section 22 is continued to form an annular side flange 23 at the periphery of the disk. The flange 23 is the counterpart of the flange 16 of the disk 13 and said flanges are designed to accommodate a demountable rim therebetween, as conventionally shown at 24, the rim resting at one margin upon the rim section 15 and at its opposite margin upon the rim section 22. The rim 24 is shown as equipped with a conventional tire 25 in which is arranged an inner tube 26 having a valve 27 extending freely through the opening 17 in the rim section 15 of the wheel and formed in said rim section at any approved point is an opening 28 to accommodate the usual lug 29 upon the rim 24 for locking the rim against creeping. Formed through the disk 21 are openings to freely accommodate the studs 20 and threaded upon said studs are clamping nuts 30 securing the disk adjacent its periphery. Threaded upon the flange 11 of the hub ring 10 is a clamping ring 31 securing the disk upon the hub ring. The ring 31 is provided with sockets to accommodate a spanner wrench and pivoted upon said ring is, as shown in detail in Figure 3, a spring pressed latch 32 engageable in the sockets 12 of the flange 11 selectively for locking the clamping ring against retrograde movement.

As previously intimated, the present wheel is particularly designed for use in connection with conventional motor vehicle wheel hubs and in the drawings, I have shown such a hub at 33. At its inner end, this hub is provided with the usual radial flange 34 and formed to fit over the outer end of the hub is the customary ring 35. A conventional brake drum is shown at 36, this drum seating flat against the inner side of the hub flange 34 and, as will now be observed, the hub ring 10 of the wheel is formed to snugly fit the hub seating flat against said flange at its outer side, the central opening in the inner disk 13 of the wheel being of a size to snugly accommodate said flange. Similarly, the flange 11 at the outer side of the hub ring is of a diameter to accommodate the ring 35 which fits within said flange seating flat against the ring 10 and extending through the rings 10 and 35, through the hub flange 34, and the drum 36, is a plurality of bolts 37 rigidly securing the wheel upon the wheel hub. Thus, as will now be appreciated, the wheel may be readily mounted upon a conventional hub. As is usual, the hub is threaded at its outer end and detachably engaged thereon is a closure cap 38 channeled at its periphery to seat the outer edge of the flange 11 of the hub ring.

Detachably mounted upon the tire valve 27 at its free end is an elbow shaped nipple 39 in the inner end of which is fixed a rubber ring 40 snugly fitting over the valve for connecting the nipple thereto, while, at its outer end, the nipple projects freely through a suitable opening in the outer disk 21 of the wheel and carries a removable cap 41. Thus, the tire may be readily inflated by attaching an air supply hose to the outer end of the nipple. To remove the rim 24 with the tire 25 thereon, the nuts 30 of the studs 20 are first taken off, when the clamping ring 31 is then displaced and the nipple 39 removed. The outer disk of the wheel may then be easily slipped from the hub to release the rim. Accordingly, the rim and tire may be arranged upon the wheel or displaced therefrom with a minimum of difficulty.

Having thus described the invention, what is claimed as new is:

1. A wheel for attachment to a wheel hub including a hub ring formed to accomodate the hub and provided at its outer side with a flange, companion wheel disks mounted upon the ring, one of said disks freely surrounding said flange, and means upon the flange detachably locking said disk upon the hub ring.

2. A wheel for attachment to a wheel hub including a hub ring formed to accommodate the hub and provided at its outer side with a flange, companion wheel disks mounted upon the ring, one of said disks freely surrounding said flange, a clamping ring threaded upon said flange locking said disk upon the hub ring, and means carried by the clamping ring to coact with the flange locking the clamping ring against retrograde movement.

3. A wheel for attachment to a wheel hub including a hub ring formed to accommodate the hub, a disk mounted upon the ring at its inner side and provided with a rim section extended to form a side flange, a disk detachably seating against the ring at its outer side and formed with a rim section surrounding the free margin of said first mentioned section mating therewith and extended to provide a side flange to cooperate with said first mentioned flange, studs carried by said first mentioned rim section projecting through the latter disk, means carried by said studs securing the latter disk adjacent its periphery, and means carried by the hub ring to coact with the latter disk centrally thereof clamping the latter disk upon the ring.

4. A wheel including a hub ring formed to accommodate a hub and provided at its outer side with a flange, companion wheel disks mounted upon the ring, one of said disks freely surrounding said flange, a clamping ring threaded upon the flange locking said disk upon the ring, and a latch coacting between the clamping ring and flange locking the clamping ring against retrograde movement.

5. A wheel including a hub ring formed to accommodate a hub projecting through the ring and provided at its outer side with a flange, companion wheel disks mounted upon the ring, one of said disks freely surrounding said flange, means upon the flange detachably locking said disk upon the hub ring, and a cap engaging over the outer end of the hub cooperating with the flange.

6. A wheel including a hub ring formed to accommodate a hub and provided at its outer side with a flange, a wheel disk seating against the inner side of the ring secured thereto, a wheel disk seating against the outer side of the ring freely surrounding said flange, and means upon the flange detachably locking the latter disk upon the hub ring.

7. The combination with a wheel hub having a flange, of a hub ring of single thickness surrounding the hub abutting said flange, means extending through the ring and the flange securing the ring upon the hub, a wheel disk mounted upon the ring at its inner side, means connecting said disk with the ring independently of said first mentioned means, a companion wheel disk mounted upon the ring at its outer side, and means detachably locking the latter disk upon the hub ring.

In testimony whereof I affix my signature.

ANDREW PATRICK TEEVIN. [L. S.]